(12) United States Patent
Hisano

(10) Patent No.: US 9,868,434 B2
(45) Date of Patent: Jan. 16, 2018

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Taishi Hisano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 14/906,416

(22) PCT Filed: Jul. 8, 2014

(86) PCT No.: PCT/IB2014/001283
§ 371 (c)(1),
(2) Date: Jan. 20, 2016

(87) PCT Pub. No.: WO2015/011533
PCT Pub. Date: Jan. 29, 2015

(65) Prior Publication Data
US 2016/0159337 A1    Jun. 9, 2016

(30) Foreign Application Priority Data

Jul. 22, 2013 (JP) .................................. 2013-151499

(51) Int. Cl.
*B60W 20/00* (2016.01)
*B60W 20/13* (2016.01)
(Continued)

(52) U.S. Cl.
CPC ............... *B60W 20/13* (2016.01); *B60K 6/20* (2013.01); *B60W 10/06* (2013.01); *B60W 10/08* (2013.01);
(Continued)

(58) Field of Classification Search
CPC ........ B60W 20/00; B60W 30/20; B60L 11/18
(Continued)

(56) References Cited

U.S. PATENT DOCUMENTS

2013/0041543 A1* 2/2013 Takayanagi ............ B60K 6/445
                                                        701/22
2013/0096764 A1* 4/2013 Yamamoto ............. B60K 6/445
                                                        701/22
(Continued)

FOREIGN PATENT DOCUMENTS

JP      2003-235108 A     8/2003
JP      2011-131829 A     7/2011
(Continued)

*Primary Examiner* — Thomas G Black
*Assistant Examiner* — Wae L Louie
(74) *Attorney, Agent, or Firm* — Oliff PLC

(57) ABSTRACT

A vehicle includes an engine, a motor generator, an electrical storage device, a keeping switch, and a controller. The controller is configured to (a) cause the vehicle to travel by using the output of at least one of the engine and the motor generator, (b) control the state of charge of the electrical storage device, (c) when the keeping mode is requested in response to the signal output from the keeping switch and when the state of charge is higher than a threshold, execute a first keeping control for keeping the state of charge at a current value, and (d) when the keeping mode is requested in response to the signal output from the keeping switch and when the state of charge is lower than the threshold, execute a second keeping control for recovering the state of charge from a current value.

10 Claims, 8 Drawing Sheets

(51) Int. Cl.
  *B60W 10/26* (2006.01)
  *B60K 6/20* (2007.10)
  *B60W 10/06* (2006.01)
  *B60W 10/08* (2006.01)
  *B60K 1/04* (2006.01)

(52) U.S. Cl.
  CPC ............... *B60W 10/26* (2013.01); *B60K 1/04* (2013.01); *B60W 2540/04* (2013.01); *B60W 2710/244* (2013.01); *B60Y 2200/92* (2013.01); *B60Y 2300/182* (2013.01); *B60Y 2300/43* (2013.01); *B60Y 2300/60* (2013.01); *Y10S 903/93* (2013.01)

(58) Field of Classification Search
  USPC ............................ 701/22; 180/65.23, 65.265
  See application file for complete search history.

(56) References Cited

U.S. PATENT DOCUMENTS

| | | | | |
|---|---|---|---|---|
| 2015/0015063 A1* | 1/2015 | Bissontz | ................ | B60L 1/003 307/9.1 |
| 2015/0037656 A1* | 2/2015 | Noda | ................ | H01M 10/441 429/149 |
| 2015/0232083 A1* | 8/2015 | Yu | ................ | B60W 20/106 701/22 |
| 2015/0239364 A1* | 8/2015 | Baughman | ................ | G07C 5/0841 701/33.4 |
| 2015/0274029 A1* | 10/2015 | Tanaka | ................ | B60L 7/18 701/22 |
| 2015/0283963 A1* | 10/2015 | Janarthanam | ................ | B60K 6/48 307/9.1 |
| 2015/0291175 A1* | 10/2015 | Harada | ................ | B60K 6/445 701/22 |
| 2015/0321576 A1* | 11/2015 | Lee | ................ | H02J 7/044 701/22 |
| 2015/0367838 A1* | 12/2015 | Runde | ................ | B60W 10/26 701/22 |
| 2017/0001581 A1* | 1/2017 | Rinker | ................ | B60R 16/03 |

FOREIGN PATENT DOCUMENTS

| | | |
|---|---|---|
| JP | 2011-219039 A | 11/2011 |
| JP | 2011-230662 A | 11/2011 |
| WO | 2011/161814 A1 | 12/2011 |

* cited by examiner

VEHICLE AND CONTROL METHOD FOR VEHICLE

BACKGROUND OF THE INVENTION

1. Field of the Invention

The invention relates to a vehicle that is able to travel by using an output of at least one of an engine and a motor generator, and a control method for the vehicle.

2. Description of Related Art

Japanese Patent Application Publication No. 2011-219039 (JP 2011-219039 A) describes a hybrid vehicle including an engine, a battery, a motor generator that can be driven by electric power stored in the battery, and a charge priority button. The hybrid vehicle travels in a rapid charge traveling mode when the charge priority button is operated into an on state. In the rapid charge traveling mode, the vehicle travels by operating the engine, and recovers the state of charge (hereinafter, also referred to as "SOC") stored in the battery by rapidly charging the battery through power generation control over the motor generator.

The rapid charge traveling mode described in JP 2011-219039 A is a mode in which control for recovering the SOC as compared to a current value is executed (hereinafter, also referred to as "SOC recovery mode") in preparation for future usage of electric power.

SUMMARY OF THE INVENTION

A mode in which control for keeping the SOC at a current value is executed (hereinafter, also referred to as "SOC keeping mode") in preparation for future usage of electric power is conceivable as a mode similar to the SOC recovery mode. However, if the SOC at the time of switching into the SOC keeping mode is kept as it is when the SOC is low, there is a possibility that electric power becomes short at the time of future usage of electric power. For example, there is a possibility that the vehicle is not allowed to take full advantage of motor running because of a shortage of electric power although a user selects the SOC keeping mode for the purpose of carrying out future motor running using electric power.

The invention provides a vehicle that automatically ensures the state of charge higher than or equal to a predetermined value in a keeping mode in which the state of charge of an electrical storage device is kept.

A first aspect of the invention provides a vehicle. The vehicle includes an engine, a motor generator, an electrical storage device, a keeping switch, and a controller. The engine is configured to generate an output for causing the vehicle to travel. The motor generator is configured to generate an output for causing the vehicle to travel. The electrical storage device is configured to exchange electric power with the motor generator. The keeping switch is configured to output a signal that requests a keeping mode, in which a state of charge of the electrical storage device is kept, in response to user's operation. The controller is configured to (a) cause the vehicle to travel by using the output of at least one of the engine and the motor generator, (b) control the state of charge of the electrical storage device, (c) when the keeping mode is requested in response to the signal output from the keeping switch and when the state of charge is higher than a threshold, execute a first keeping control for keeping the state of charge at a current, value, and (d) when the keeping mode is requested in response to the signal output from the keeping switch and when the state of charge is lower than the threshold, execute a second keeping control for recovering the state of charge from a current value.

In the vehicle according to the first aspect of the invention, the controller may be configured to allow regenerative power generation with the use of the motor generator by using kinetic energy of the vehicle and prohibit power generation of the motor generator by using the output of the engine as the second keeping control.

The vehicle according to the first aspect of the invention may further include a recovery switch configured to output a signal that requests a recovery mode, in which the state of charge is recovered, in response to user's operation. The controller may be configured to recover the state of charge to a first target value as the second keeping control when the recovery mode is not requested in response to the signal output from the recovery switch, and execute a recovery control for recovering the state of charge to a second target value higher than the first target value when the recovery, mode is requested.

In the vehicle according to the first aspect of the invention, the first keeping control may include control for limiting a discharge power of the electrical storage device as compared to that in a mode other than the keeping mode or the recovery mode. The second keeping control may include control for raising a charge power of the electrical storage device while limiting a discharge power of the electrical storage device as compared to that in a mode other than the keeping mode or the recovery mode until the state of charge recovers to the first target value. The recovery control may include control for raising a charge power of the electrical storage device while limiting a discharge power of the electrical storage device as compared to that in a mode other than the keeping mode or the recovery mode until the state of charge reaches the second target value.

In the vehicle according to the first aspect of the invention, the vehicle may be configured to switch between hybrid running in which the vehicle travels by using the output of both the engine and the motor generator and motor running in which the vehicle travels by using the output of the motor generator while the engine is stopped. The first keeping control may include control for limiting switching into the motor running as compared to a mode other than the keeping mode or the recovery mode. The second keeping control may include control for prohibiting switching into the motor running until the state of charge recovers to the first target value. The recovery control may include control for prohibiting switching into the motor running until the state of charge reaches the second target value.

A second aspect of the invention provides a control method for a vehicle. The vehicle includes an engine, a motor generator, an electrical storage device, a keeping switch, and a controller. The engine is configured to generate an output for causing the vehicle to travel. The motor generator is configured to generate an output for causing the vehicle to travel. The electrical storage device is configured to exchange electric power with the motor generator. The keeping switch is configured to output a signal that requests a keeping mode, in which a state of charge of the electrical storage device is kept, in response to user's operation. The control method includes: causing the vehicle to travel by using the output of at least one of the engine and the motor generator by the controller; controlling the state of charge of the electrical storage device by the controller; executing, by the controller, a first keeping control for keeping the state of charge at a current value when the keeping mode is requested in response to the signal output from the keeping switch and when the state of charge is higher than a threshold; and executing, by the controller, a second keeping control for recovering the state of charge from a current value when the keeping mode is requested in response to the signal output from the keeping switch and when the state of charge is lower than a threshold.

In the control method according to the second aspect of the invention, regenerative power generation with the use of the motor generator by using kinetic energy of the vehicle may be allowed and power generation of the motor generator by using the output of the engine may be prohibited by the controller as the second keeping control.

In the control method according to the second aspect of the invention, the vehicle may include a recovery switch that outputs a signal that requests a recovery mode, in which the state of charge is recovered, in response to user's operation. As the second keeping control, the state of charge may be recovered by the controller to a first target value when the recovery mode, is not requested in response to the signal output from the recovery switch. The control method may further include executing, by the controller, a recovery control for recovering the state of charge to a second target value higher than the first target value when the recovery mode is requested.

In the control method according to the second aspect of the invention, the first keeping control may include control for limiting a discharge power of the electrical storage device as compared to that in a mode other than the keeping mode or the recovery mode by the controller. The second keeping control may include control for raising a charge power of the, electrical storage device while limiting a discharge power of the electrical storage device as compared to that in a mode other than the keeping mode or the recovery mode until the state of charge recovers to the first target value by the controller. The recovery control may include control for raising a charge power of the electrical storage device while limiting a discharge power of the electrical storage device as compared to that in a mode other than the keeping mode or the recovery mode until the state of charge reaches the second target value by the controller.

In the control method according to the second aspect of the invention, the vehicle may be able to switch between hybrid running in which the vehicle travels by using the output of both the engine and the motor generator and motor running in which the vehicle travels by using the output of the motor generator while the engine is stopped. The first keeping control may include control for limiting switching into the motor running as compared to a mode other than the keeping mode or the recovery mode by the controller. The second keeping control may include control for prohibiting switching into the motor running until the state of charge recovers to the first target value by the controller. The recovery control may include control for prohibiting switching into the motor running until the state of charge reaches the second target value by the controller.

According to the invention, it is possible to provide a vehicle that automatically ensures the state of charge higher than or equal to a predetermined value in a keeping mode in which the state of charge of an electrical storage device is kept.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
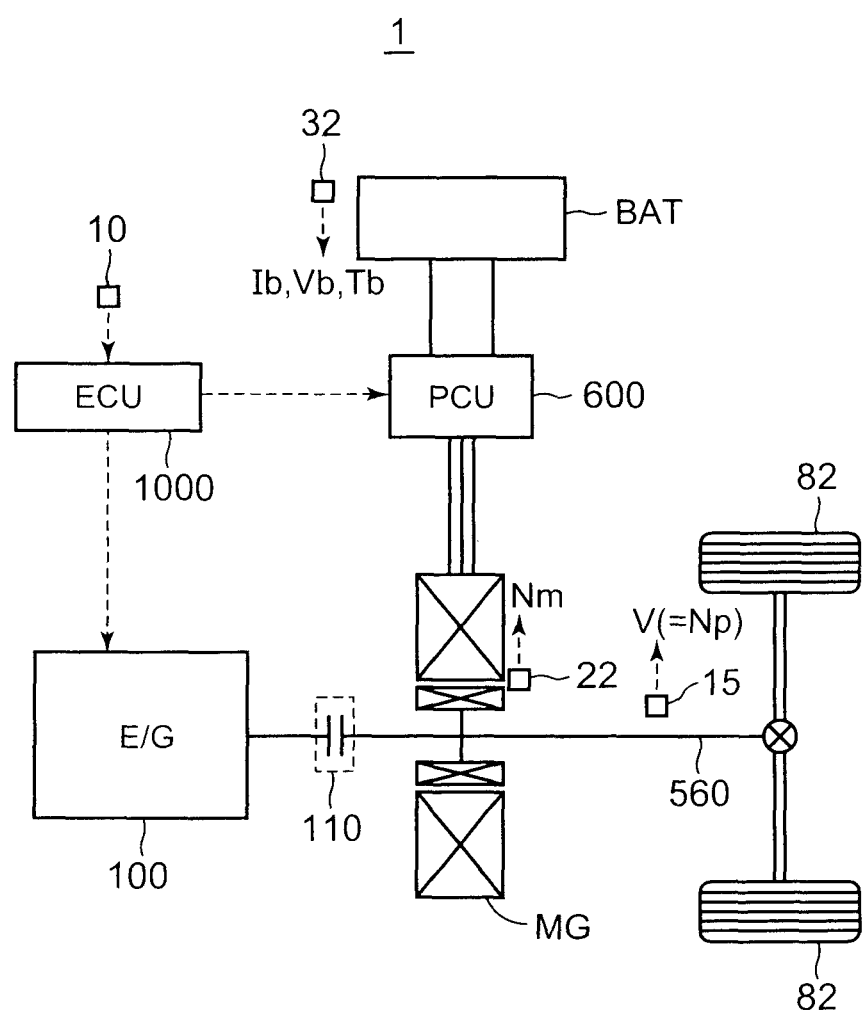
FIG. 1 is an overall block diagram of a vehicle according to a first embodiment.

Hereinafter, embodiments of the invention will be described with reference to the accompanying drawings. In the following description, like reference numerals denote the same components. Those names and functions are also the same. Thus, the detailed description thereof will not be repeated.

In the specification, the term "electric power" may mean electric power (power) in a narrow sense or may mean the amount of electric power (the amount of work) or electric energy in a broad sense, and is flexibly interpreted depending on a situation in which the term is used.

Initially, a first embodiment will be described. FIG. 1 is an overall block diagram of a vehicle 1 according to the first embodiment. The vehicle 1 includes an engine 100, a motor generator MG, a power control unit (PCU) 600, an electrical storage device BAT, and an electronic control unit (ECU) 1000.

The vehicle 1 is a hybrid vehicle that travels by rotating drive wheels 82 with the use of the output of at least one of the engine 100 and the motor generator MG.

Power generated by the engine 100 is transmitted to a drive shaft 60 via a clutch 110. The drive shaft 560 is coupled to the drive wheels 82.

The motor generator MG is an alternating-current rotary electric machine, and is typically a three-phase (U, V, W-phase) permanent magnet synchronous motor. The motor generator MG functions as not only a motor but also a generator. A rotor of the motor generator MG is directly coupled to the drive shaft 560.

The PCU 600 converts direct-current power, which is supplied from the electrical storage device BAT, to alternating-current power, and outputs the alternating-current power to the motor generator MG. Thus, the motor generator MG is driven. The PCU 600 converts alternating-current power, which is generated by the motor generator MG, to direct-current power, and outputs the direct-current power to the electrical storage device BAT. Thus, the electrical storage device BAT is charged. The PCU 600 includes a converter that converts voltage and an inverter that converts electric power.

The electrical storage device BAT stores direct-current power for driving the motor generator MG. The electrical storage device BAT is typically configured to include nickel-metal hydrides or lithium ions.

The vehicle 1 according to the first embodiment is able to carry out any one of motor running, engine power generation running, hybrid running and engine running. In motor running, the vehicle 1 is caused to travel by rotating the drive shaft 560 with the use of the output of the motor generator MG while the engine 100 is stopped. In engine power generation running, the vehicle 1 is caused to travel by rotating the drive shaft 560 while electric power is generated by the motor generator MG with the use of the output of the engine 100. In hybrid running, the vehicle 1 is caused to travel by rotating the drive shaft 560 with the use of the output of both the engine 100 and the motor generator MG. In engine running, the vehicle 1 is caused to travel by rotating the drive shaft 560 with the use of the power of the engine 100 while the motor generator MG is stopped. In motor running, the clutch 110 is released. The clutch 110 is engaged in the other runnings.

The vehicle 1 includes a vehicle speed sensor 15, a resolver 22 and a monitoring sensor 32. The vehicle speed sensor 15 detects a rotation speed Np of the drive shaft 560 as a vehicle speed V. The resolver 22 detects the rotation speed Nm of the motor generator MG. The monitoring sensor 32 detects the state (voltage Vb, current Ib, temperature Tb, and the like) of the electrical storage device BAT. These sensors output the detected results to the ECU 1000.

Furthermore, the vehicle 1 includes an SOC keeping switch 10. The SOC keeping switch 10 outputs a signal that requests a mode for keeping the state of charge (hereinafter, referred to as "SOC") of the electrical storage device BAT (hereinafter, referred to as "SOC keeping mode") in response to user's operation. In the following description, the SOC is expressed by percent where the maximum capacity is 100 percent.

The ECU 1000 incorporates a central processing unit (CPU) and a memory (which are not shown), and executes predetermined arithmetic processing on the basis of information stored in the memory and information from the sensors. The ECU 1000 controls devices mounted on the vehicle 1 on the basis of the result of arithmetic processing.

The ECU 1000 calculates the SOC of the electrical storage device BAT on the basis of the detected result of the monitoring sensor 32. Various known methods, such as a method of calculating the SOC by using a correlation between an open circuit voltage (OCV) and SOC of the electrical storage device BAT and a method of calculating the SOC by using an accumulated value of current Ib, may be used as a method of calculating the SOC.

The ECU 1000 sets a dischargeable power WOUT and chargeable power WIN (both in watts) of the electrical storage device BAT on the basis of the SOC, temperature Tb, and the like, of the electrical storage device BAT. The ECU 1000 calculates a required discharge power or required charge power of the electrical storage device BAT on the basis of a user's accelerator operation amount and a vehicle speed V. The ECU 1000 controls the PCU 600 such that an actual discharge power Pout or actual charge power Pin of the electrical storage device BAT becomes the required discharge power or required charge power of the electrical storage device BAT. At this time the actual discharge power Pout is limited so as not to exceed the dischargeable power WOUT. The actual charge power Pin is limited so as not to exceed the chargeable power WIN.

The ECU 1000 switches a mode for controlling the SOC of the electrical storage device BAT (hereinafter, referred to as "SOC control mode") to one of a normal mode and the SOC keeping mode. When the SOC keeping switch 10 is depressed in the normal mode, the ECU 1000 switches the SOC control mode to the SOC keeping mode. When the SOC keeping switch 10 is depressed in the SOC keeping mode, the ECU 1000 cancels the SOC keeping mode and returns the SOC control mode to the normal mode.

In the vehicle 1 having the above-described configuration, the ECU 1000 executes control for keeping the SOC in preparation for future usage of electric power (hereinafter, referred to as "SOC keeping control") in the SOC keeping mode. However, if a low SOC is kept as it is when the SOC at the time of starting SOC keeping control is low, there is a possibility that electric power becomes short at the time of future usage of electric power. For example, even when a user depresses the SOC keeping switch 10 in preparation for future motor running, there is a possibility that it is not possible to sufficiently ensure an available travel distance of motor running.

Therefore, the ECU 1000 according to the first embodiment executes keeping control for keeping a current SOC (hereinafter, referred to as "first SOC keeping control") in the SOC keeping mode when the current SOC is higher than a target keeping lower limit value A. On the other hand, the ECU 1000 executes keeping control for recovering the SOC to the target keeping lower limit value A (hereinafter, referred to as "second SOC keeping control") when the current SOC is lower than the target keeping lower limit value A.

Figure 2:
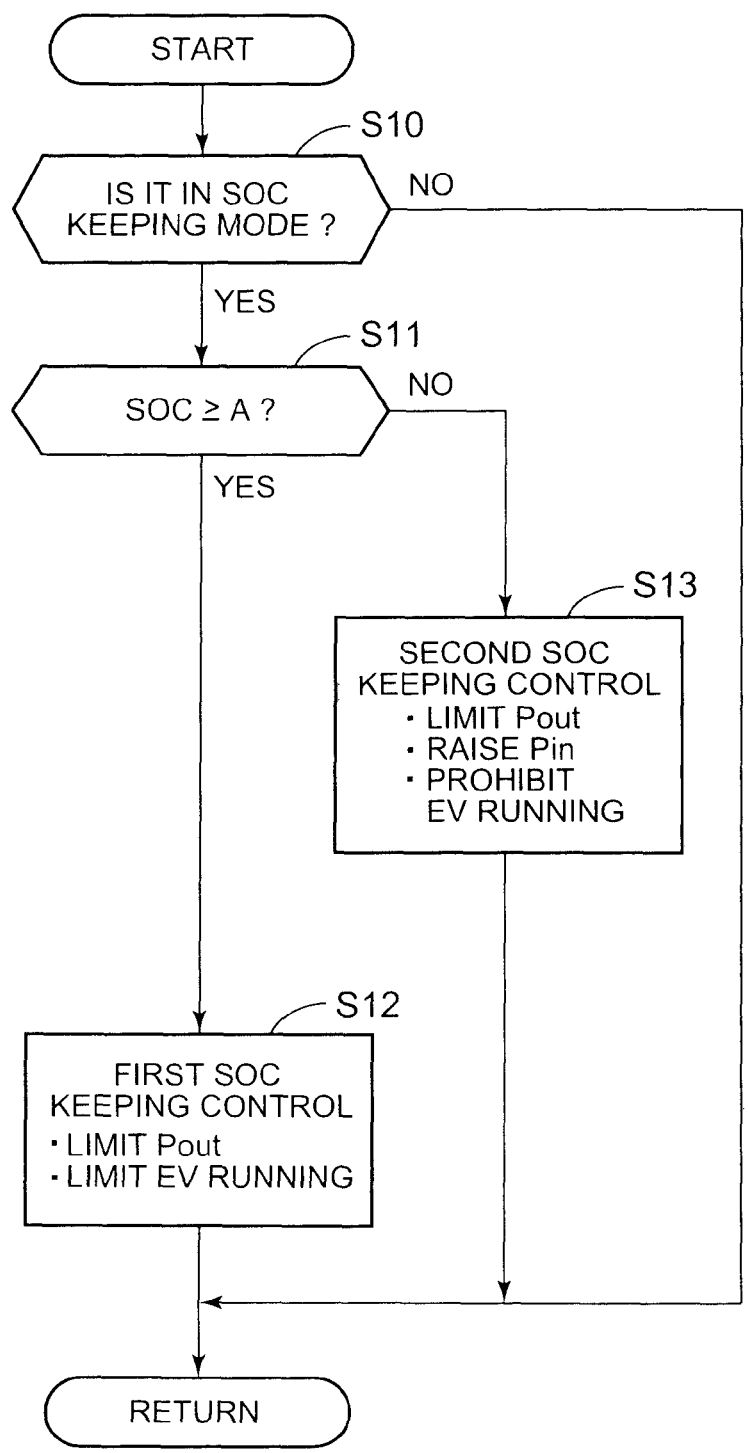
FIG. 2 is a flowchart that shows the procedure of an ECU according to the first embodiment.

FIG. 2 is a flowchart that shows the procedure at the time when the ECU 1000 executes SOC keeping control. The flowchart is repeatedly executed at predetermined intervals.

In step (hereinafter, step is abbreviated to "S") 10, the ECU 1000 determines whether it is in the SOC keeping mode. When it is not in the SOC keeping mode (NO in S10), that is, it is in the normal mode, the ECU 1000 ends the process.

When it is in the SOC keeping mode (YES in S10), the ECU 1000 determines whether the current SOC is higher than the target keeping lower limit value A. In the first embodiment, the target keeping lower limit value A is allowed to be arbitrarily selected within a predetermined range (for example, the range of 30% to 50%) by user's operation of an input device (not shown). The target keeping lower limit value A may be a fixed value (for example, 40%).

When the current SOC is higher than or equal to the target keeping lower limit value A (YES in S11), the ECU 1000 executes first SOC keeping control for keeping the current SOC (S12). In the present embodiment, the first SOC keeping control includes control for limiting the actual discharge power Pout of the electrical storage device BAT as compared to that in the normal mode and control for limiting switching into motor running as compared to that in the normal mode. Thus, the SOC is more hard to be consumed than that in the normal mode, so the current SOC is more easily kept. A method of limiting the actual discharge power Pout, for example, just needs to decrease at least one of the required discharge power and the dischargeable power WOUT as compared to that in the normal mode. A method of limiting switching into motor running, for example, just needs to tighten a condition for switching into motor running as compared to that in the normal mode.

On the other hand, when the current SOC is lower than the target keeping lower limit value A (NO in S11), the ECU 1000 executes second SOC keeping control for recovering the SOC to the target keeping lower limit value A (S13). In the first embodiment, the second SOC keeping control includes control for limiting the actual discharge power Pout of the electrical storage device BAT as compared to that in the normal mode, control for raising the actual charge power Pin of the electrical storage device BAT as compared to that in the normal, mode and control for prohibiting switching into motor running. Thus, the SOC is more hard to be consumed than that during first SOC keeping, control, and the amount of electric power with which the electrical storage device BAT is charged increases, so recovery of the SOC is facilitated. A method of raising the actual charge power Pin, for example, just needs to raise at least one of the required charge power and the chargeable power W IN as compared to that in the normal mode.

Figure 3:
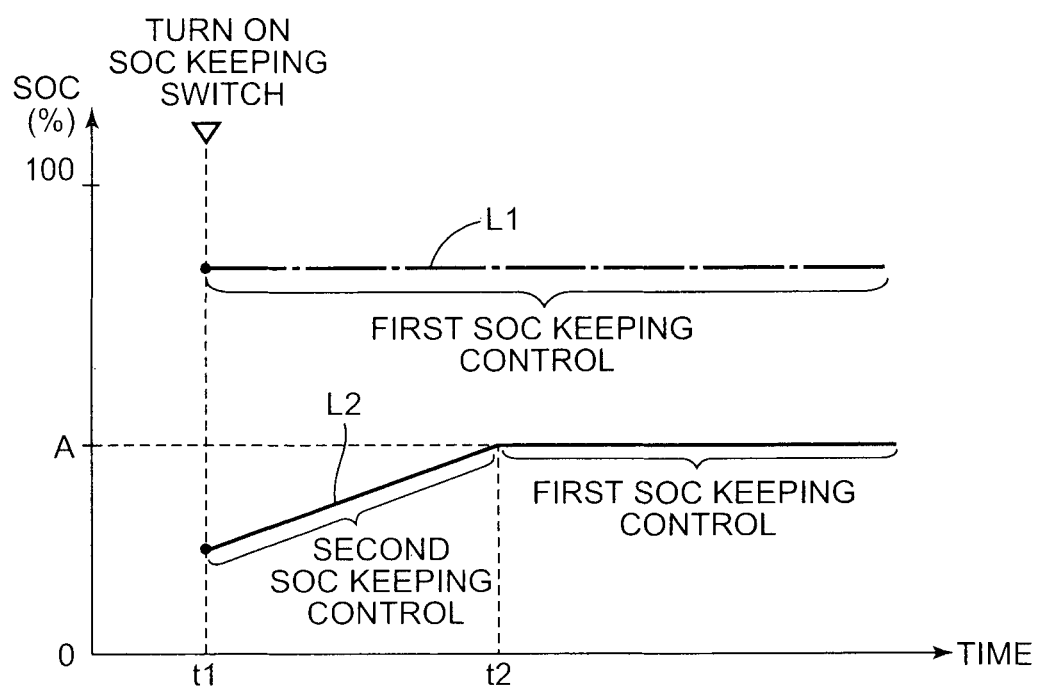
FIG. 3 is a graph that schematically shows a mode of change in SOC in an SOC keeping mode according to the first embodiment.

FIG. 3 is a view that schematically shows a mode of change in SOC in the SOC keeping mode. In the illustration of FIG. 3, it is assumed that the user depresses the SOC keeping switch 10 at time t1 to switch into the SOC keeping mode in preparation for future motor running.

In this case, as indicated by the alternate long and short dashed line L1, when the SOC at time t1 is higher than the target keeping lower limit value A, the SOC is kept at a value at time t1 through first SOC keeping control. Therefore, at the time of carrying out motor running by consuming the SOC thereafter, it is possible to carry out motor running over a longer distance than a distance corresponding to the target keeping lower limit value A (that is, an available travel distance at the time of carrying out motor running by consuming the target keeping lower limit value A).

On the other hand, as indicated by the continuous line L2, when the SOC at time t1 is lower than the target keeping lower limit value A, the SOC initially rises (recovers) froth the value at time t1 through second SOC keeping control. At time t2 at which the SOC has recovered to the target keeping lower limit value A, SOC keeping control is switched from the second SOC keeping control to the first SOC keeping control. Therefore, after time t2, the SOC is kept at the target keeping lower limit value A. Thus, at the time of carrying out motor running by consuming the SOC thereafter, it is possible to carry out motor running over at least the distance corresponding to the target keeping lower limit value A.

As described above, in the SOC keeping mode, the ECU 1000 according to the first embodiment keeps the current SOC through first SOC keeping control when the current SOC is higher than or equal to the target keeping lower limit value A, whereas the ECU 1000 automatically recovers the SOC to the target keeping lower limit value A through second SOC keeping control and then keeps the SOC at the target keeping lower limit value A when the current SOC is lower than the target keeping lower limit value A. Therefore, in the SOC keeping mode, it is possible to automatically ensure the SOC higher than or equal to the target keeping lower limit value A. Thus, it is possible to avoid a shortage of electric power at the time of future usage of electric power.

Particularly, in the first embodiment, the user is allowed to arbitrarily select the target keeping lower limit value A. Therefore, the user on his own is allowed to adjust the SOC that is ensured in the SOC keeping mode on the basis of the amount of electric power (for example, a distance over which the vehicle is intended to travel in motor running) that is predicted to be required after the SOC keeping mode.

In the first embodiment, in the SOC keeping mode, an SOC value for switching between first SOC keeping control and second SOC keeping control and an SOC value for recovering through second SOC keeping control are set to the same "target keeping lower limit value A"; however, both may be set to different values. For example, one of the first SOC keeping control and the second SOC keeping control may be selected on the basis of whether the SOC at the start of the SOC keeping mode is higher than the target keeping lower limit value A and then a target recovery value of the SOC at the time when the second SOC keeping control is selected may be set to a value higher than or lower than the target keeping lower limit value A.

Figure 4:
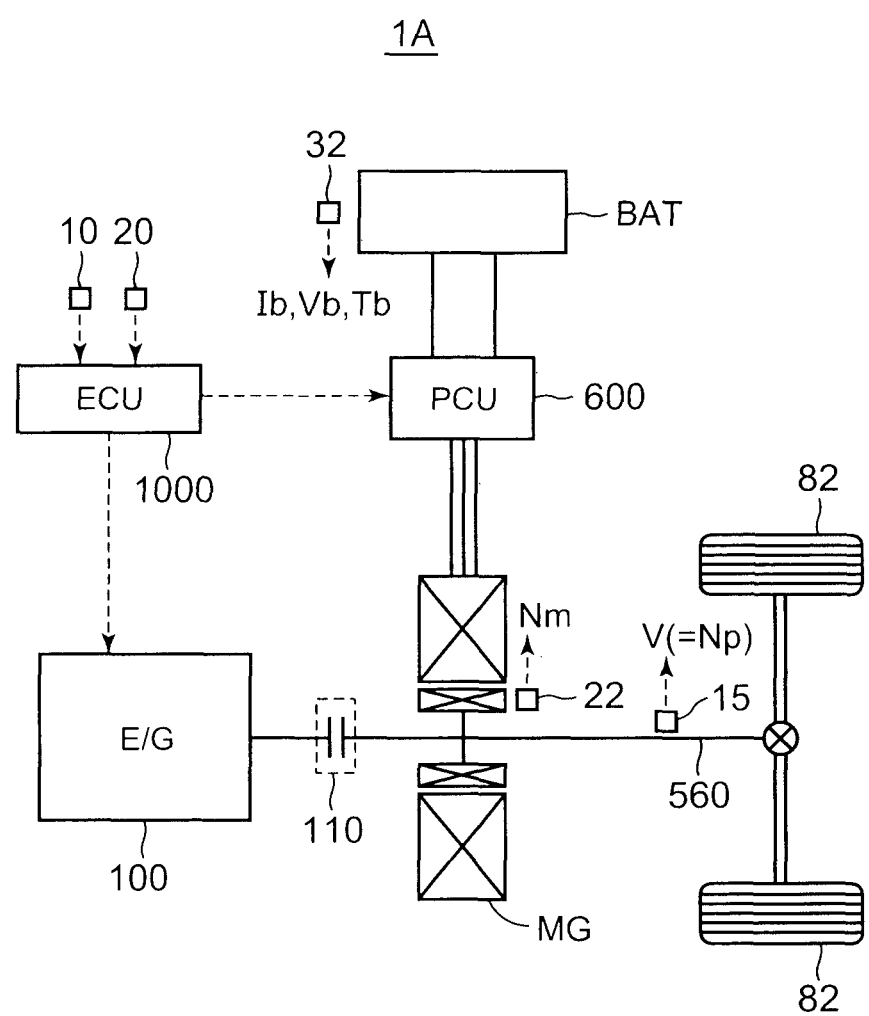
FIG. 4 is an overall block diagram of a vehicle according to a second embodiment.

Next, a second embodiment will be described. FIG. 4 is an overall block diagram of a vehicle 1A according to the second embodiment. The vehicle 1A additionally includes an SOC recovery switch 20 in comparison with the vehicle 1 according to the above-described first embodiment. That is, the vehicle 1A according to the second embodiment includes the SOC recovery switch 20 in addition to the SOC keeping switch 10. The other hardware configuration is the same as that of the above-described first embodiment, so the detailed description will not be repeated here.

The SOC recovery switch 20 outputs a signal that requests a mode for recovering the SOC (hereinafter, referred to as "SOC recovery mode") in response to user's operation.

The ECU 1000 switches the SOC control mode to any one of the normal mode, the SOC keeping mode and the SOC recovery mode.

When the SOC keeping switch 10 is depressed in the mode other than the SOC keeping mode (the normal mode or the SOC recovery mode), the ECU 1000 switches the SOC control mode to the SOC keeping mode. On the other hand, when the SOC keeping switch 10 is depressed in the SOC keeping mode, the ECU 1000 cancels the SOC keeping mode and returns the SOC control mode to the normal mode.

When the SOC recovery switch 20 is depressed in the mode other than the SOC recovery mode (the normal mode or the SOC keeping mode), the ECU 1000 switches the SOC control mode to the SOC recovery mode. On the other hand, when the SOC recovery switch 20 is depressed in the SOC recovery mode, the ECU 1000 cancels the SOC recovery mode and returns the SOC control mode to the normal mode. When the SOC has recovered to a target recovery value B (described later) in the SOC recovery mode as well, the ECU 1000 cancels the SOC recovery mode and returns the SOC control mode to the normal mode.

The above-described method of switching the SOC control mode is only illustrative, and is not limited to this configuration. For example, even when the SOC keeping switch 10 is depressed in the SOC recovery mode, the SOC recovery mode may be maintained by giving a priority to the SOC recovery mode. In the case where the SOC control mode has been switched from the SOC keeping mode to the SOC recovery mode, the SOC control mode may be returned to the original SOC keeping mode when the SOC recovery switch 20 is depressed again.

In the thus configured vehicle 1A, the ECU 1000 executes similar control to SOC keeping control (first SOC keeping control or second SOC keeping control), described in the above first embodiment, in the SOC keeping mode. The ECU 1000 executes control for recovering the SOC (hereinafter, referred to as "SOC recovery control") in preparation for future usage of electric power in the SOC recovery mode.

Figure 5:
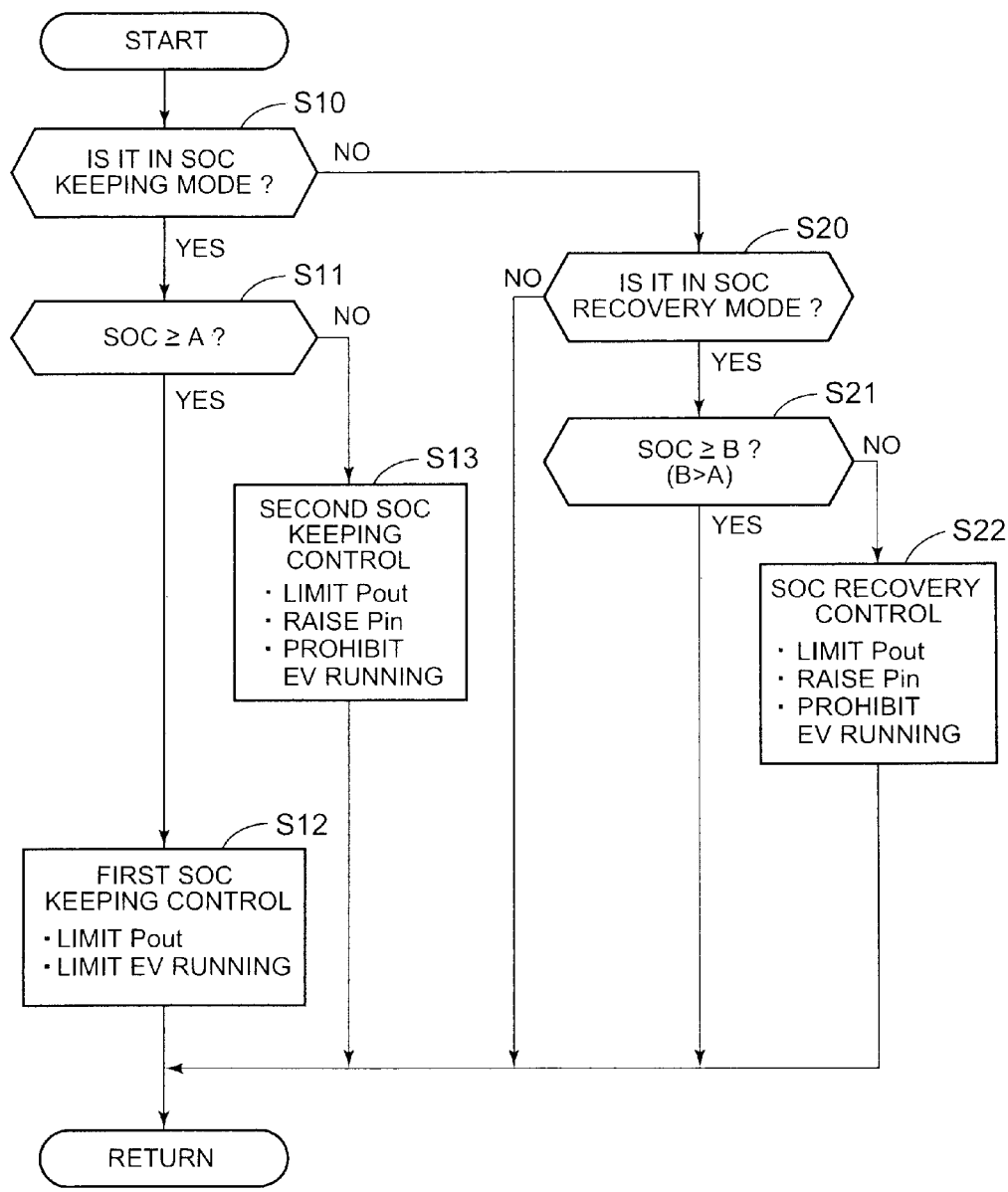
FIG. 5 is a flowchart that shows the procedure of an ECU according to the second embodiment.

FIG. 5 is a flowchart that shows the procedure at the time when the ECU 1000 executes SOC keeping control or SOC recovery control.

The ECU 1000 determines whether it is in the SOC keeping mode (S10). When it is in the SOC keeping mode (YES in S10), the ECU 1000 executes SOC keeping control in S11 to S13. The details of the processes of S11 to S13 are the same as the details of the processes of S11 to S13 shown in FIG. 2, so the detailed description will not be repeated here.

On the other hand, when it is not in the SOC keeping mode (NO in S10), the ECU 1000 determines whether it is in the SOC recovery mode (S20). When it is not in the SOC recovery mode (NO in S20), that is, it is in the normal mode, the ECU 1000 ends the process.

When it is in the SOC recovery mode (YES in S20), the ECU 1000 determines whether the current SOC is higher than or equal to the target recovery value B (S21). In the present embodiment, the target recovery value B is a fixed value (for example, 70%) higher than the target keeping lower limit value A. The target recovery value B is allowed to be arbitrarily selected within a predetermined range (for example, the range of 60% to 80%) by user's operation of an input device (not shown). In any case, the target recovery value B is set to a value higher than the target keeping lower limit value A.

When the current SOC is lower than the target recovery value B (NO in S21), the ECU 1000 executes SOC recovery control for recovering the SOC to the target recovery value B (S22). In the second embodiment, the SOC recovery control (the process of S22) differs from the above-described second SOC keeping control (the process of S13) in the target recovery value of the SOC (see FIG. 6 described later); however, specific details of the process are the same. That is, as the SOC recovery control, the ECU 1000 executes control for limiting the actual discharge power Pout of the electrical storage device BAT as compared to that in the normal mode, control for raising the actual charge power Pin of the electrical storage device BAT as compared to that in the normal mode and control for prohibiting switching into motor running. The details of the process may be varied between the SOC recovery control and the above-described second SOC keeping control. For example, in order to more early recover the SOC in SOC recovery control than in second SOC keeping control, the amount of rise in the actual charge power Pin in SOC recovery control may be set to a value higher than the amount of rise in the actual charge power Pin in second SOC keeping control.

On the other hand, when the current SOC is higher than or equal to the target recovery value B (YES in S21), the ECU 1000 ends the process. The case where the current SOC is higher than the target recovery value B includes both the case where the SOC at the time of switching into the SOC recovery mode has already been higher than or equal to the target recovery value B and the case where the SOC has recovered to the target recovery value B in the SOC recovery mode.

Figure 6:
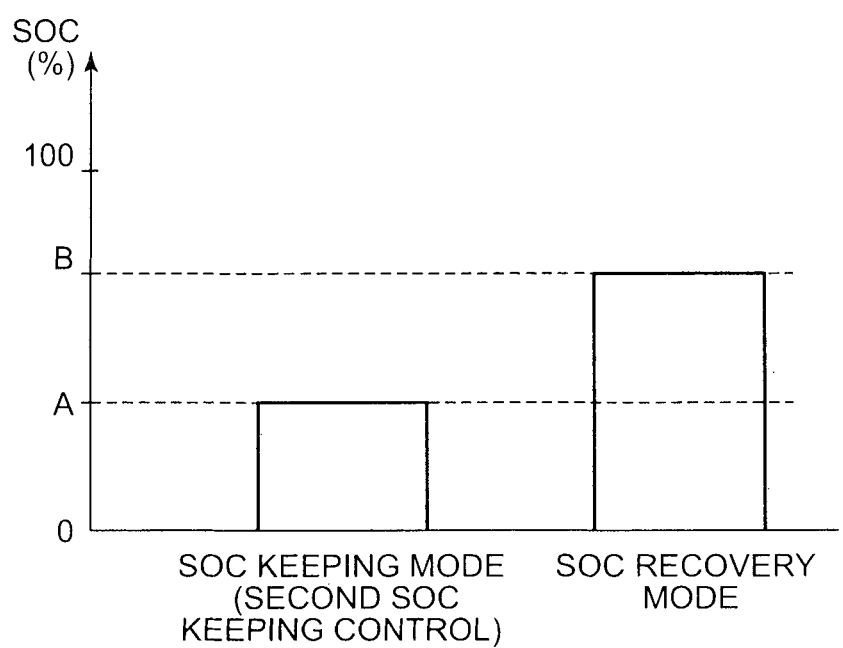
FIG. 6 is a graph that shows a comparison between a target recovery value B in an SOC recovery mode and a target keeping lower limit value A in an SOC keeping mode according to the second embodiment.

FIG. 6 is a view that shows a comparison between the target recovery value B in the SOC recovery mode and the target keeping lower limit value A in the SOC keeping mode.

The SOC recovery mode is a mode for recovering the SOC from the current value even by consuming fuel of the engine 100 in preparation for future usage of electric power (for example, motor running). On the other hand, the SOC keeping mode is basically a mode for keeping the SOC at the current value. In this way, the purpose of the SOC recovery mode and the purpose of the SOC keeping mode are different from each other.

The target value for recovering the SOC in each mode is set in association with such a difference in purpose. That is, the target value for recovering the SOC in the SOC recovery mode is set to the relatively high "target recovery value B" (for example, 70%). Thus, it is possible to ensure a sufficient amount of electric power at the time of future usage of electric power.

In contrast to this, the target value for recovering the SOC in the SOC keeping mode is the "target keeping lower limit value A" (for example, 40%) lower than the target recovery value B. In this way, in the SOC keeping mode, it is possible to Suppress deterioration of fuel economy due to excessive consumption of fuel of the engine 100 for ensuring the SOC while ensuring a required SOC.

As described above, in the second embodiment, the target value for recovering the SOC in the SOC keeping mode is set to a value lower than the target value for recovering the SOC in the SOC recovery mode. Thus, it is possible to ensure a sufficient amount of electric power in the SOC recovery mode, and it is possible to suppress excessive engine fuel consumption while ensuring a required SOC in the SOC keeping mode.

A first alternative embodiment to the first and second embodiments will be described. In the above-described first and second embodiments, at the time of recovering the SOC in the SOC keeping mode, only regenerative charging (charging of the electrical storage device BAT with electric power regeneratively generated by the motor generator MG by using the kinetic energy of the vehicle) while the vehicle is decelerating may be allowed, and charging (charging of the electrical storage device BAT with electric power generated by the motor generator MG by using the output of the engine 100) at the time of engine output may be prohibited.

Figure 7:
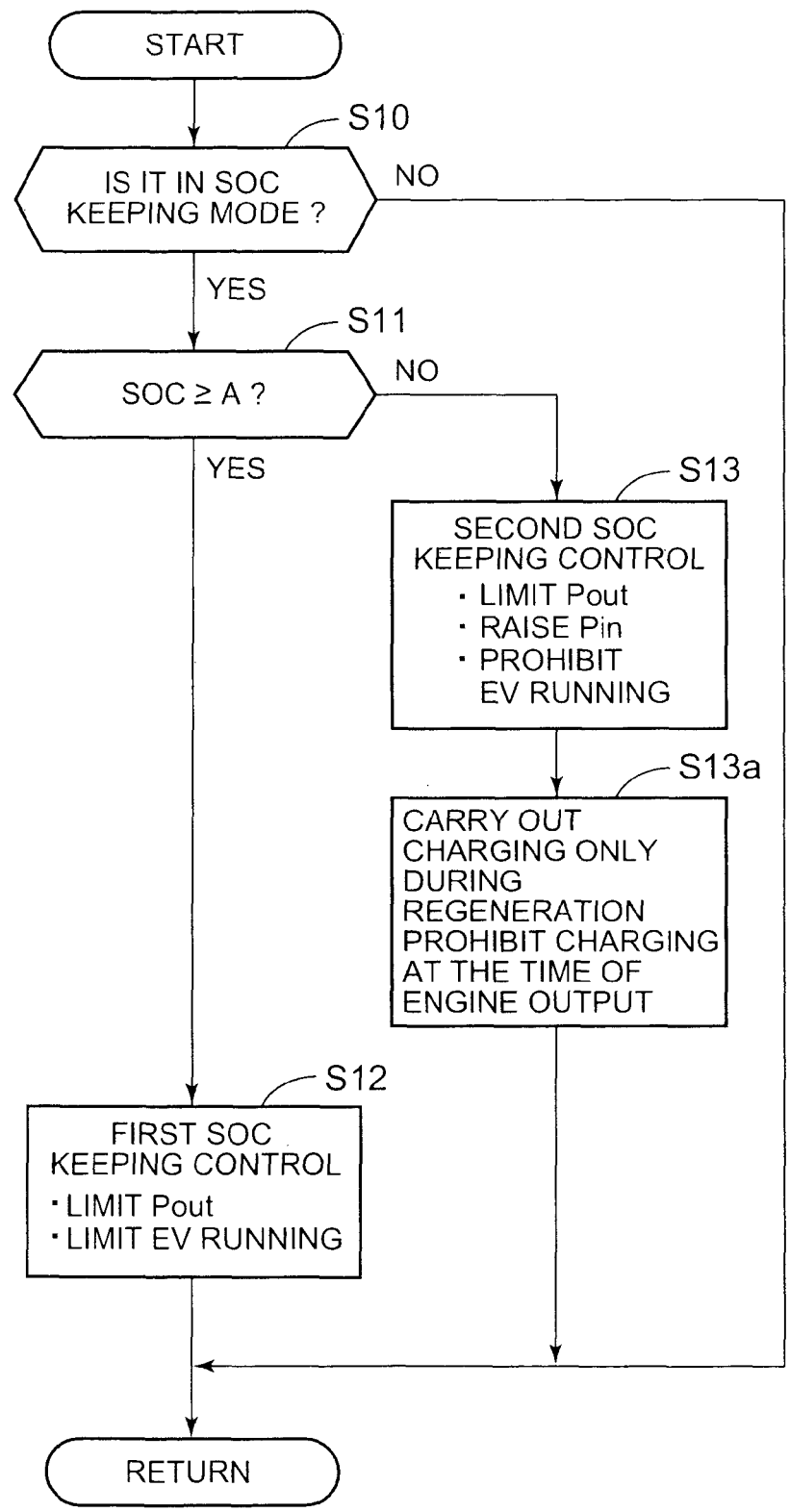
FIG. 7 is a flowchart that shows the procedure of an ECU according to a first alternative embodiment.

FIG. 7 is a flowchart that shows an example of the procedure of the ECU 1000 in the case where the first alternative embodiment is applied to the above-described first embodiment. The flowchart additionally includes the process of S13a in the flowchart shown in FIG. 2 described in the first embodiment.

When the ECU 1000 executes second SOC keeping control in S13, only regenerative charging during vehicle deceleration is allowed, and charging at the time of engine output is prohibited (S13a).

In this way, in the SOC keeping mode, a time required to recover the SOC to the target keeping lower limit value A extends because charging opportunities are limited to the time when the vehicle decelerates (when the engine output is 0), and the SOC is allowed to be recovered without consuming fuel of the engine 100.

In the process of S13a, a charging rate at the time of engine output (the amount of rise in engine output for power generation) may be set so as to be lower than that in the normal mode. In this way as well, a time required to recover the SOC to the target keeping lower limit value A extends; however, an engine load during traveling reduces, so it is possible to suppress deterioration of fuel economy.

A second alternative embodiment to the first and second embodiment will be described. In the above-described first and second embodiments, the case where the invention is applied to the hybrid vehicle in which the engine and the single motor generator are coupled in series with each other is described. However, a vehicle to which the invention is applicable is not limited to a hybrid vehicle having such a structure.

Figure 8:
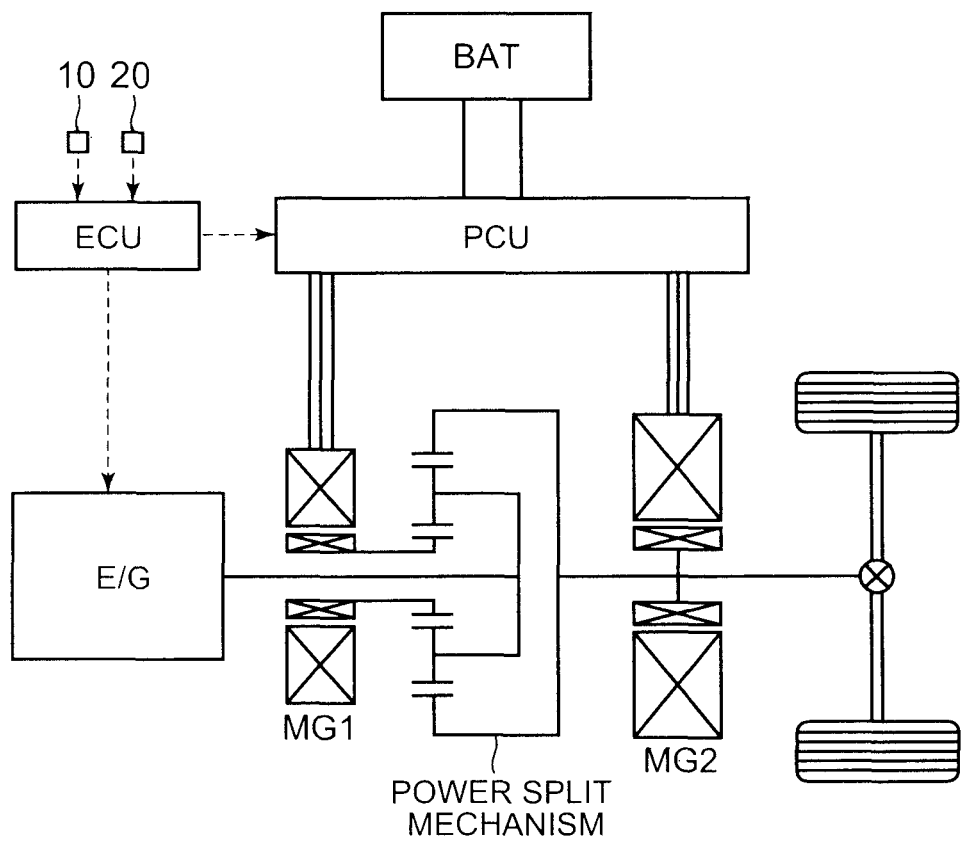
FIG. 8 is an overall block diagram of a vehicle according to a second alternative embodiment.

For example, as shown in FIG. 8, the invention is also applicable to a hybrid vehicle in which an engine and two motor generators MG1, MG2 are coupled by a power split mechanism formed of a planetary gear unit.

The embodiments described above are illustrative and not restrictive in all respects. The scope of the invention is defined by the appended claims rather than the above description. The scope of the invention is intended to encompass all modifications within the scope of the appended claims and equivalents thereof.

What is claimed is:

1. A vehicle comprising:
an engine configured to generate an output for causing the vehicle to travel;
a motor generator configured to generate an output for causing the vehicle to travel;
an electrical storage device configured to exchange electric power with the motor generator;
a keeping switch configured to output a signal that requests a keeping mode, in which a state of charge of the electrical storage device is kept, in response to user's operation; and
a controller configured to:
(a) cause the vehicle to travel by using the output of at least one of the engine and the motor generator;
(b) control the state of charge of the electrical storage device;
(c) when the keeping mode is requested in response to the signal output from the keeping switch and when the state of charge is higher than a threshold, execute a first keeping control for keeping the state of charge at a current value; and
(d) when the keeping mode is requested in response to the signal output from the keeping switch and when the state of charge is lower than the threshold, execute a second keeping control for recovering the state of charge from a current value.

2. The vehicle according to claim 1, wherein
the controller is configured to allow regenerative power generation with the use of the motor generator by using kinetic energy of the vehicle and prohibit power generation of the motor generator by using the output of the engine as the second keeping control.

3. The vehicle according to claim 1, further comprising:
a recovery switch configured to output a signal that requests a recovery mode, in which the state of charge is recovered, in response to user's operation, wherein
the controller is configured to recover the state of charge to a first target value as the second keeping control when the recovery mode is not requested in response to the signal output from the recovery switch, and execute a recovery control for recovering the state of charge to a second target value higher than the first target value when the recovery mode is requested.

4. The vehicle according to claim 3, wherein
the first keeping control includes control for limiting a discharge power of the electrical storage device as compared to that in a mode other than the keeping mode or the recovery mode,
the second keeping control includes control for raising a charge power of the electrical storage device while limiting a discharge power of the electrical storage device as compared to that in a mode other than the keeping mode or the recovery mode until the state of charge recovers to the first target value, and
the recovery control includes control for raising a charge power of the electrical storage device while limiting a discharge power of the electrical storage device as compared to that in a mode other than the keeping mode or the recovery mode until the state of charge reaches the second target value.

5. The vehicle according to claim 3, wherein
the vehicle is configured to switch between hybrid running in which the vehicle travels by using the output of both the engine and the motor generator and motor running in which the vehicle travels by using the output of the motor generator while the engine is stopped,
the first keeping control includes control for limiting switching into the motor running as compared to a mode other than the keeping mode or the recovery mode,
the second keeping control includes control for prohibiting switching into the motor running until the state of charge recovers to the first target value, and
the recovery control includes control for prohibiting switching into the motor running until the state of charge reaches the second target value.

6. A control method for a vehicle, the vehicle including an engine, a motor generator, an electrical storage device, a keeping switch, and a controller, the engine being configured to generate an output for causing the vehicle to travel, the motor generator being configured to generate an output for causing the vehicle to travel, the electrical storage device being configured to exchange electric power with the motor generator, the keeping switch being configured to output a signal that requests a keeping mode, in which a state of charge of the electrical storage device is kept, in response to user's operation, the control method comprising:
causing the vehicle to travel by using the output of at least one of the engine and the motor generator by the controller;
controlling the state of charge of the electrical storage device by the controller;
executing, by the controller, a first keeping control for keeping the state of charge at a current value when the keeping mode is requested in response to the signal output from the keeping switch and when the state of charge is higher than a threshold; and
executing, by the controller, a second keeping control for recovering the state of charge from a current value when the keeping mode is requested in response to the signal output from the keeping switch and when the state of charge is lower than a threshold.

7. The control method according to claim 6, wherein
as the second keeping control, regenerative power generation with the use of the motor generator by using kinetic energy of the vehicle is allowed and power generation of the motor generator by using the output of the engine is prohibited by the controller.

8. The control method according to claim 6, wherein
the vehicle includes a recovery switch configured to output a signal that requests a recovery mode, in which the state of charge is recovered, in response to user's operation, and
as the second keeping control, the state of charge is recovered by the controller to a first target value when the recovery mode is not requested in response to the signal output from the recovery switch,
the control method further comprising:
executing, by the controller, a recovery control for recovering the state of charge to a second target value higher than the first target value when the recovery mode is requested.

9. The control method according to claim 8, wherein
the first keeping control includes control for limiting a discharge power of the electrical storage device as compared to that in a mode other than the keeping mode or the recovery mode by the controller,
the second keeping control includes control for raising a charge power of the electrical storage device while limiting a discharge power of the electrical storage device as compared to that in a mode other than the keeping mode or the recovery mode until the state of charge recovers to the first target value by the controller, and the recovery control includes control for raising a charge power of the electrical storage device while limiting a discharge power of the electrical storage device as compared to that in a mode other than the keeping mode or the recovery mode until the state of charge reaches the second target value by the controller.

10. The control method according to claim 8, wherein the vehicle is able to switch between hybrid running in which the vehicle travels by using the output of both the engine and the motor generator and motor running in which the vehicle travels by using the output of the motor generator while the engine is stopped, the first keeping control includes control for limiting switching into the motor running as compared to a mode other than the keeping mode or the recovery mode by the controller, the second keeping control includes control for prohibiting switching into the motor running until the state of charge recovers to the first target value by the controller, and the recovery control includes control for prohibiting switching into the motor running until the state of charge reaches the second target value by the controller.

\* \* \* \* \*